No. 705,970. Patented July 29, 1902.
O. F. SHATTUCK.
SOLAR ATTACHMENT FOR TRANSIT INSTRUMENTS.
(Application filed Nov. 14, 1901.)

(No Model.) 2 Sheets—Sheet 1.

WITNESSES:

INVENTOR.
Orville F. Shattuck
BY
ATTORNEY.

No. 705,970. Patented July 29, 1902.
O. F. SHATTUCK.
SOLAR ATTACHMENT FOR TRANSIT INSTRUMENTS.
(Application filed Nov. 14, 1901.)

(No Model.) 2 Sheets—Sheet 2.

WITNESSES:
INVENTOR.
Orville F. Shattuck
BY
ATTORNEY.

THE NORRIS PETERS CO., PHOTO-LITHO., WASHINGTON, D. C.

UNITED STATES PATENT OFFICE.

ORVILLE F. SHATTUCK, OF DENVER, COLORADO.

SOLAR ATTACHMENT FOR TRANSIT INSTRUMENTS.

SPECIFICATION forming part of Letters Patent No. 705,970, dated July 29, 1902.

Application filed November 14, 1901. Serial No. 82,298. (No model.)

*To all whom it may concern:*

Be it known that I, ORVILLE F. SHATTUCK, a citizen of the United States of America, residing at Denver, in the county of Arapahoe and State of Colorado, have invented certain new and useful Improvements in Solar Attachments for Transit Instruments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in solar attachments for transit, theodolite, or similar instruments, the object being to facilitate the finding of the true meridian with instruments of this class.

My improved device may be readily applied to and detached from the objective extremity of the telescope of any instrument of this character without change or alteration in the construction of the latter.

The effectiveness of my improvement is dependent on the optical principle that a ray of light which suffers reflection twice in the same plane makes after its second reflection an angle with its original direction equal to twice the angle between the reflecting-surfaces. By the use of this principle the accuracy of the results is not dependent either upon the precise adjustment of the attachment with reference to the instrument nor upon the exactness of the construction of the solar attachment itself, but upon the maintenance of a given angle between the reflectors during an observation.

Having briefly outlined my improvement, the principle upon which it operates, and the object sought to be attained thereby, I will proceed to describe the same in detail, reference being made to the accompanying drawings, in which is illustrated an embodiment thereof.

Figure 9:
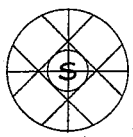
Figure 1:
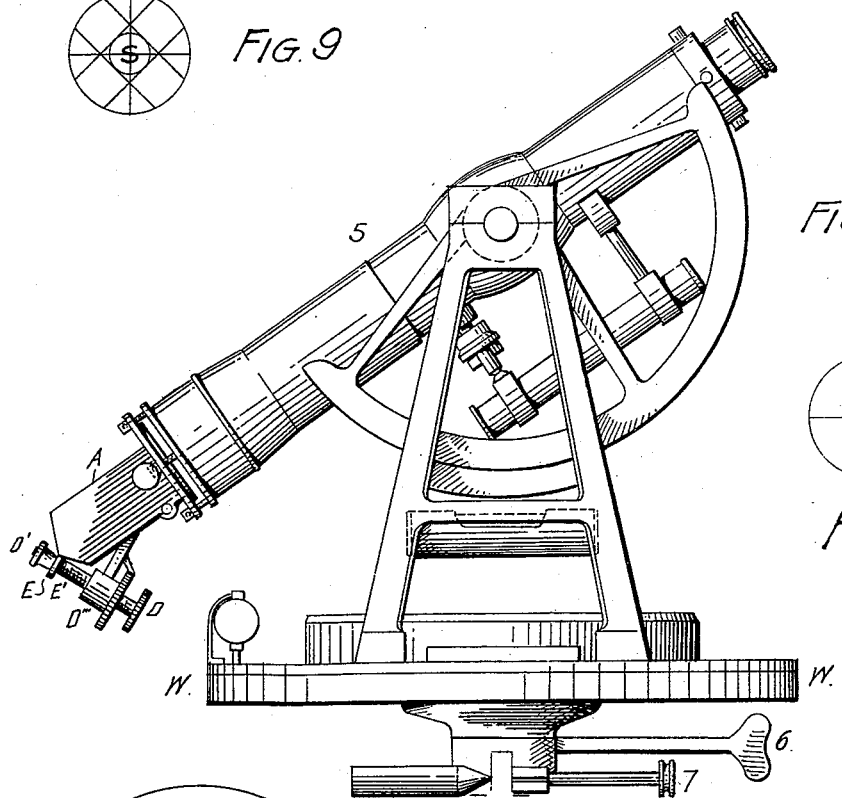
Figure 8:
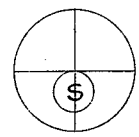
Figure 6:
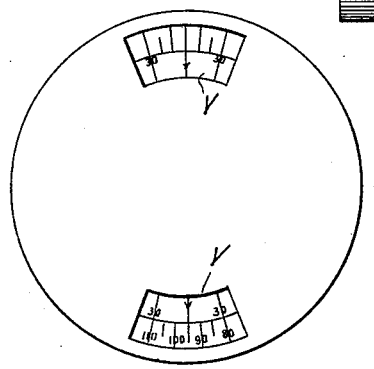
Figure 7:
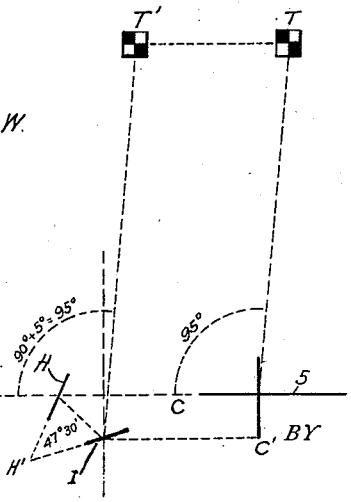
Figure 2:
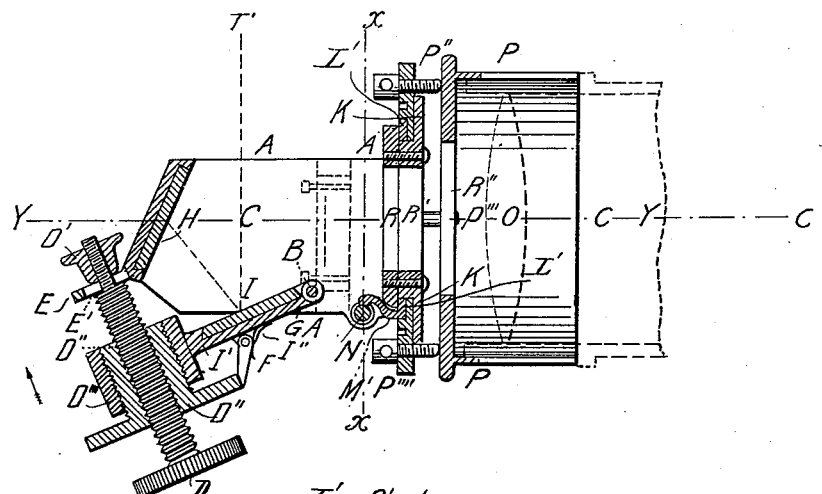
Figure 3:
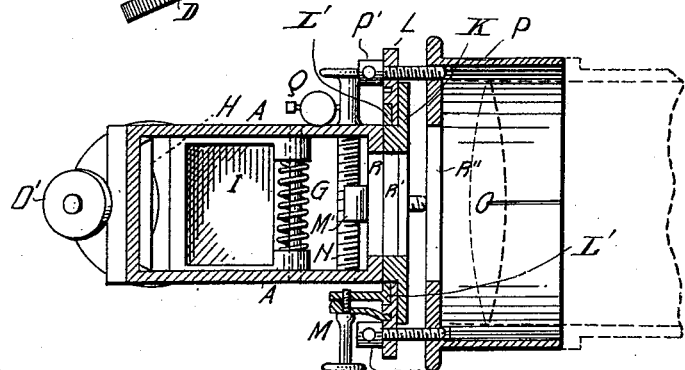
Figure 5:
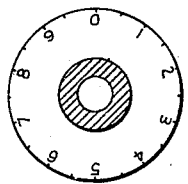
Figure 4:
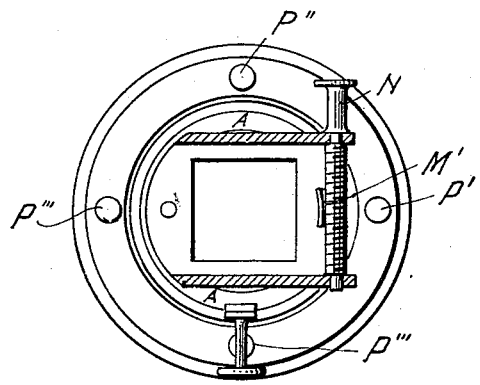

In the drawings, Figure 1 is a side elevation of a transit instrument equipped with my improved solar attachment. Fig. 2 is a central vertical section taken through the attachment, its parts being shown on a larger scale. Fig. 3 is a section taken on the line $y\,y$, Fig. 1.
Fig. 4 is a cross-section taken on the line $x\,x$, Fig. 2. Fig. 5 is a face view of the graduated head of a differentially-threaded nut to facilitate the proper adjustment of the angle between the reflectors. Fig. 6 is a plan view of the horizontal limb of a transit instrument shown on a smaller scale than in Fig. 1. Fig. 7 is a diagrammatic view illustrating the use of the attachment. Figs. 8 and 9 illustrate the position of the sun in the reticule of different instruments. The image of the sun is represented by a circle designated S in these views.

The same reference characters indicate the same parts in all the views.

Let A A designate the standards or parallel side pieces of a bracket whose base is attached by screws to a flanged journal K, which revolves on the base-plate L. To a ring L', which is set into the base-plate, is attached a clamping device M and a curved lug M'. The latter is provided with teeth or threads engaging the threads of a slow-motion tangent-screw N, the extremities of which are journaled in the standards A A. The base-plate L is attached to the telescope in any convenient manner to occupy a position beyond the objective of the instrument. Preferably it is fastened to a cap P, which fits over the objective end of the telescope, by means of screws with capstan-heads P' and P''', which pass through plain openings in the base-plate L and are threaded into the end of the cap P, while other screws P'' and P'''' are threaded in the base-plate L and bear against the end of the cap P. A reflector H is securely attached to the parts A A in front (see Figs. 2 and 3) at such an angle that the rays of light from the objective O are reflected toward a second reflector I, pivotally attached to one side of the standards A A, by means of a pivot B, about which the reflector moves upon turning a screw D. My experiments indicate that the best results are attained by placing the reflector H at an angle of sixty-seven degrees and thirty minutes with the line of sight C C C of the instrument. (In this description the rays of light are traced backward out of the telescope to the reflectors, &c.)

The pivot B and the reflector I are placed perpendicular to a plane which is perpendicular to the reflector H and passes through the line of collimation C C. This plane is called the "plane of the solar."

The extremity of the screw D remote from its head is reduced in size, forming a shoulder which rests against a lug E, mounted on the parts A A. A clamp-nut D', which is applied to the reduced end of the screw D and engages the lug E on the opposite side from the shoulder of the screw, may be employed to lock the screw in any desired position of adjustment.

The reflector I is susceptible of a more delicate movement than can be accomplished by the screw D. This, as shown in the drawings, (see Fig. 2,) is accomplished by means of a differentially-threaded nut D'', which coöperates with the screw D. The nut D'' is provided on the inside with threads of a certain pitch—say fifty-six threads to the inch—fitting the threads on the screw D, while on the outside of said nut the threads are of slightly-different pitch—say fifty-two threads to the inch. The nut D'' is arranged to turn in a fixed nut D''', which is attached to the plate or arm I', carrying the reflector I. With this arrangement and pitch of the threads on the nut D'' and with a perpendicular distance of ninety-four hundredths of an inch from the axis of the screw D to the pivot B one revolution of the nut D'' changes the angle between the line of sight C C and the second reflected ray I T' (see Figs. 2 and 7) ten minutes of arc. The head of the nut D'' is therefore graduated or divided into ten equal parts. (See Fig. 5.) An index F is attached to the plate I' and is held by a spring I'' against the periphery of the head of the screw D''. As the graduations are turned past the index F each division corresponds to a change in the direction of the second reflected ray I T' of one minute of arc. The index F, pressing against the milled head of the nut D'', also acts as a stop or clamp to the motion of the nut when it is not in use.

The lost motion of the screw D and the nut D'' is overcome by the torsional action of a spiral spring G, coiled around the pivot B between the standards A A. One extremity of this spring bears against the plate I' holding the reflector I, and therefore actuates the reflector in the direction indicated by the arrow in Fig. 1.

To provide for the passage of light from the reflector H to the objective O, an opening is made through the base of the standards A A at R through the journal K at R' and through the cap P at R''.

To adapt this solar attachment to the eccentricities of any instrument, a level Q, attached to one of the standards A, is employed. This level is located at right angles to the axis of the journal K. By using the level and the adjusting-screws P', P''', P'', and P'''' the axis of the journal K may be made parallel to the line of sight or collimation C C C when the telescope is pointed to the zenith. A high degree of accuracy in this adjustment is not required on account of the use in this solar of the optical principle above stated.

To determine the true meridian by means of the double-reflecting solar, heretofore described, the surveying or astronomical instrument is leveled and the usual adjustment made. On the horizontal limb W of the instrument the vernier V is set at an angle equal to ninety degrees plus or minus the sun's declination, corrected for refraction, according to whether the sun is north or south of the celestial equator. In this case (see Fig. 7) it is assumed that the sun is five degrees north and the vernier is set at ninety-five degrees. Without changing the reading of the vernier the telescope 5 in a horizontal position is sighted at the target T. The cap P, carrying the solar attachment, is placed in its position about the objective and the instrument is turned about its vertical axis until the vernier of the horizontal limb is set at zero. With the telescope still in a horizontal position and the vernier clamped at zero, the center of a target T' is brought into the sight-line of the telescope by turning the screw D, the target T' being so placed that the distance T T' equals the distance from the center of the instrument C' to the center of the reflector I. The screw D is then clamped in this position by means of the nut D'. Then the angle H H' I (see Fig. 7) between the reflectors H and I is forty-seven degrees and thirty minutes and the angle between the original ray C H and the second reflected ray I T' is twice that amount, or ninety-five degrees, and will remain at ninety-five degrees in whichever direction the reflectors may be turned, so long as the angle between them remains at forty-seven degrees and thirty minutes. Then set off the latitude of the place of observation on the vertical limb or arc by depressing the object end of the telescope, still carrying the cap P and solar. With the vernier V of the horizontal limb W still at zero the telescope is pointed approximately south and the image of the sun brought into the field of view by turning the solar upon its journal K, which is then clamped with the clamp-screw M. Having also set the clamp 6 of the horizontal limb, the center of the sun's image is brought to the center of the reticule (see Fig. 9) by turning the tangent-screw N and the tangent-screw 7 of the limb of the instrument. The telescope then points due south and the instrument is in the meridian. The solar becomes an equatorial instrument, which revolves about the extension of the line of sight of the telescope as its polar axis, the emergent ray I T' describing on the sky the path of the sun parallel to the celestial equator. The instrument being in the meridian, the solar is removed.

Should the instrument used not have a reticule similar to the one shown in Fig. 9, but instead single vertical and horizontal cross-wires, the corrected declination set off in the solar, as above described, is also corrected for the sun's semidiameter multiplied by the cosine of the hour angle of the sun at the time of observation and the sun's image brought into the position shown in Fig. 2, which can be done with great precision.

Should it be desired to make other solar observations later in the day, it is not necessary to reset the proper angle in the solar attachment by observing terrestrial objects, as described above, but simply by turning the nut D'' as many divisions or graduations as are required by the hourly change in the sun's declination and refraction.

If it is preferred, the same results may be obtained by setting off in the solar attachment declination angles complementary to those above described, elevating the telescope to point to the north end of the polar axis instead of the south, and proceeding as above.

As to the mechanical arrangement of the reflectors in this solar attachment, there are several other positions in which the reflectors H and I may be placed and similar results obtained, but in each case the principle involved is the same. The positions that I have adopted permit of a more compact construction of the attachment than any of the others. The same is true of the differential threads. A differential nut is used instead of a differential screw, the former being more compact and the principle being the same in both.

Having thus described my invention, what I claim is—

1. In a solar attachment for transit, theodolite or similar instruments, the combination with the telescope, of two reflectors mounted to rotate about the objective extremity of the telescope while the latter remains stationary, and arranged to reflect a ray of light twice, substantially as described.

2. In an instrument of the class described, the combination with the telescope, of a bracket revolubly mounted on the objective extremity of the instrument and composed of two parallel side pieces, two reflectors mounted between the parallel members of the bracket and arranged to reflect a ray of light twice before entering the objective of the telescope.

3. In an instrument of the class described, the combination with the telescope, of a bracket revolubly mounted on the objective extremity of the telescope and composed of two parallel side pieces, and two reflectors mounted between the sides of the bracket, one being fixed and the other movable to vary the angle between them, substantially as described.

4. The combination with the telescope of a transit, theodolite or similar instrument, of a reflector-holder revolubly mounted on the objective extremity of the telescope, two reflectors mounted on said holder and turning therewith, the reflectors being arranged at suitable angles to each other to reflect a ray of light twice, suitable means for regulating one of the reflectors to vary their angle, and suitable means for rotating the reflector-holder on the telescope, substantially as described.

5. The combination with the telescope of a transit, theodolite or similar instrument, of a reflector-holder revolubly mounted on the objective extremity of the telescope, two reflectors mounted on said holder and turning therewith, the reflectors being arranged at suitable angles to each other to reflect a ray of light twice, the second reflection being in the line of the optical axis of the telescope, and suitable means for regulating one of the reflectors to vary their angles for the purpose set forth.

6. The combination with the telescope of a transit or similar instrument, of a reflector-holder revolubly mounted on the objective extremity of the telescope, two reflectors mounted on said holder and arranged to twice reflect a ray of light, the second reflection being in line of the optical axis of the telescope, one of the reflectors being pivotally mounted, and a differentially-threaded nut mounted to regulate the position of the pivoted reflector for the purpose set forth.

7. The combination with the telescope of a transit or similar instrument, of a bracket revolubly mounted to project beyond the objective of the telescope, two reflectors mounted on said bracket, one of them being fixed and crossing the line of sight of the telescope at a suitable angle, and the other being arranged at a suitable angle to the first and pivotally connected with the bracket, and a differentially-threaded nut suitably mounted for regulating the position of the pivoted reflector to vary its angle with the fixed reflector, substantially as described.

8. The combination with the telescope of a transit or similar instrument, of a bracket revolubly mounted to project beyond the objective of the telescope, two reflectors mounted on said bracket, one of them being fixed, and the other being arranged at a suitable angle to the first, and pivotally connected with the bracket, a differentially-threaded nut suitably mounted for regulating the position of the pivoted reflector to vary its angle with the fixed reflector, the said nut having a graduated head, substantially as described and for the purpose set forth.

9. The combination with the telescope of an instrument of the class described, of a bracket mounted to project beyond the objective of the telescope, two reflectors mounted on said bracket and arranged to form a suitable angle with each other, one of the said reflectors being pivotally connected with the bracket, a differentially-threaded nut suitably mounted for regulating the position of the pivoted reflector, the head of said nut being graduated for the purpose set forth, and a spring-held pointer mounted on the bracket and engaging the head of said nut, substantially as described.

10. The combination with the telescope of a transit or similar instrument, of a bracket revolubly mounted on the objective extremity of the telescope and projecting beyond the same, two reflectors mounted on said bracket and arranged at a suitable angle to each other, and suitable means for rotating the reflector-carrying bracket, substantially as described.

11. The combination with the telescope of a transit or similar instrument, of a reflector-holder revolubly mounted on the objective extremity of the telescope and projecting forward therefrom, two reflectors mounted on said reflector-holder and arranged to rotate therewith, the two reflectors being arranged to form an angle with each other and also arranged to twice reflect a ray of light, the second reflection being in line of the optical axis of the telescope, one of the reflectors being movably mounted, and a screw mounted on the reflector-holder, to regulate the position of the movable reflector for the purpose set forth.

12. The combination with the telescope of a transit, theodolite, or similar instrument, of a reflector-holder revolubly mounted on the objective extremity of the telescope, two reflectors mounted on said holder and turning therewith, the reflectors being arranged at suitable angles to each other to reflect a ray of light twice, suitable means for rotating the reflector-holder on the telescope, and suitable means for locking said holder in any desired position of adjustment, substantially as described.

In testimony whereof I affix my signature in presence of two witnesses.

ORVILLE F. SHATTUCK.

Witnesses:
DENA NELSON,
A. J. O'BRIEN.